(12) United States Patent
Wu

(10) Patent No.: US 9,116,311 B2
(45) Date of Patent: Aug. 25, 2015

(54) CIRCUIT BOARD AND OPTICAL-ELECTRICAL MODULE WITH SAME

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 114 days.

(21) Appl. No.: 13/873,234

(22) Filed: Apr. 30, 2013

(65) Prior Publication Data

US 2014/0140667 A1    May 22, 2014

(30) Foreign Application Priority Data

Nov. 22, 2012    (TW) .............................. 101143811 A

(51) Int. Cl.
 *G02B 6/12* (2006.01)
 *G02B 6/42* (2006.01)
 *H01R 9/00* (2006.01)

(52) U.S. Cl.
 CPC . *G02B 6/42* (2013.01); *G02B 6/428* (2013.01)

(58) Field of Classification Search
 CPC ......... G02B 6/3628; G02B 6/42; G02B 6/428
 USPC .................................................. 361/774, 777
 See application file for complete search history.

(56) References Cited

U.S. PATENT DOCUMENTS

| 5,805,428 | A  | * | 9/1998  | Singer ........................... 361/777 |
| 5,898,574 | A  | * | 4/1999  | Tan et al. ....................... 361/777 |
| 5,920,464 | A  | * | 7/1999  | Yokoyama et al. ............ 361/779 |
| 6,259,038 | B1 | * | 7/2001  | Sakaguchi et al. ............. 174/261 |
| 6,438,281 | B1 | * | 8/2002  | Tsukamoto et al. ............. 385/14 |
| 6,739,761 | B2 | * | 5/2004  | Tsukamoto et al. ............. 385/89 |
| 6,804,423 | B2 | * | 10/2004 | Tsukamoto et al. ............. 385/14 |
| 6,949,771 | B2 | * | 9/2005  | Yoganandan et al. ........... 257/99 |
| 7,448,016 | B2 | * | 11/2008 | Tai et al. ........................ 716/137 |
| 7,723,855 | B2 | * | 5/2010  | Tsai et al. ...................... 257/786 |
| 8,811,782 | B2 | * | 8/2014  | Maetani .......................... 385/49 |
| 8,860,219 | B2 | * | 10/2014 | Wu ................................. 257/738 |
| 2002/0051599 | A1 | * | 5/2002 | Tsukamoto et al. ............ 385/14 |
| 2002/0061154 | A1 | * | 5/2002 | Tsukamoto et al. ............ 385/14 |
| 2005/0162761 | A1 | * | 7/2005 | Hargis et al. .................. 359/820 |
| 2006/0294489 | A1 | * | 12/2006 | Tai et al. ........................ 716/15 |
| 2007/0074898 | A1 | * | 4/2007 | Tai et al. ....................... 174/260 |
| 2012/0281378 | A1 | * | 11/2012 | Chen ............................. 361/777 |
| 2013/0294779 | A1 | * | 11/2013 | Wu ................................ 398/139 |
| 2014/0140667 | A1 | * | 5/2014  | Wu ................................ 385/92 |

* cited by examiner

*Primary Examiner* — Rhonda Peace
(74) *Attorney, Agent, or Firm* — Novak Druce Connolly Bove + Quigg LLP

(57) ABSTRACT

A circuit board includes a mounting surface and a number of connecting pads on the mounting surface. Each of the connecting pads defines a mounting area for mounting an element thereon. At least two of the connecting pads are substantially circular-shaped.

4 Claims, 2 Drawing Sheets

CIRCUIT BOARD AND OPTICAL-ELECTRICAL MODULE WITH SAME

BACKGROUND

1. Technical Field

The present disclosure relates to circuit boards and, particularly, to a circuit board for an optical-electrical module and an optical-electrical module with the circuit board.

2. Description of Related Art

In optical communication apparatuses, optical-electrical modules are configured for generating/receiving optical signals. An optical-electrical module generally includes an emitter for emitting optical signals, a receiver for receiving optical signals, a driver chip for driving the emitter, and an amplifier electrically connected to the receiver. The emitter, the receiver, the driver chip, and the amplifier are mounted on a circuit board. To reduce insertion loss, the emitter should be optically aligned with an output optical fiber, and the receiver should be optically aligned with an input optical fiber. As such, the emitter and the receiver must be positioned precisely on the circuit board. Marks can be formed on the circuit board to assist the installation of the emitter and the receiver on the circuit board. However, the marks occupy space of the circuit board, adversely affecting minimization of the optical-electrical module.

What is needed therefore is a circuit board and an optical-electrical module with the circuit board addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
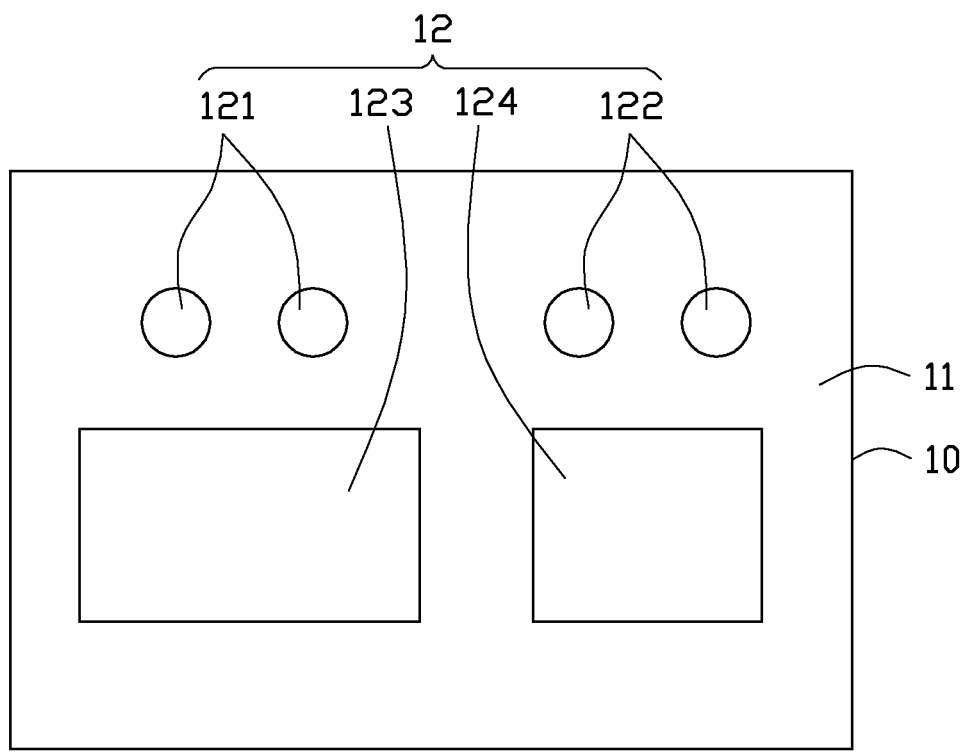
FIG. 1 is a top view of a circuit board, according to an exemplary embodiment of the present disclosure.
Figure 2:
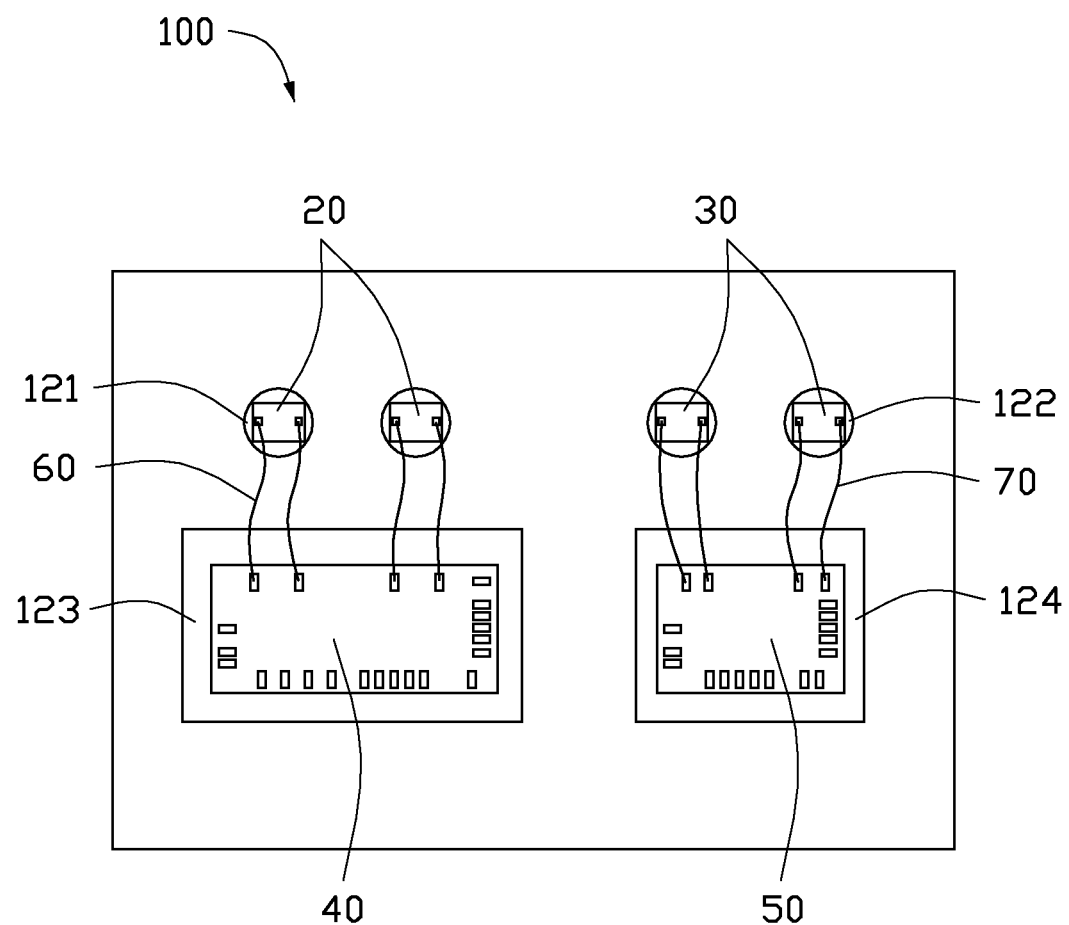
FIG. 2 is a top view of an optical-electrical module with the circuit board of FIG. 1, according to an exemplary embodiment of the present disclosure.

Referring to FIGS. 1-2, an optical-electrical module 100, according to an embodiment, includes a circuit board 10, two emitters 20, two receivers 30, a driver chip 40, and an amplifier 50. The emitters 20, the receivers 30, the driver chip 40, and the amplifier 50 are positioned on the circuit board 10. The drive chip 40 is electrically connected to the emitters 20, and the amplifier 50 is electrically connected to the receivers 30.

The circuit board 10 includes a mounting surface 11 and a number of connecting pads 12 formed on the mounting surface 11. Each of the connecting pads 12 defines a mounting area for mounting a corresponding element. The connecting pads 12 include two first connecting pads 121 corresponding to the emitters 20, two second connecting pads 122 corresponding to the receivers 30, a third connecting pad 123 corresponding to the driver chip 40, and a fourth connecting pad 124 corresponding to the amplifier 50. The first connecting pads 121 and the second connecting pads 122 are substantially circular-shaped. The first connecting pads 121 and the second connecting pads 122 are arranged along a linear direction.

The circuit board 10 can be produced by the following steps:

First, a substrate is provided. The substrate is made from an insulative material, such as resin or ceramic.

A conductive layer is formed on a surface of the substrate. In this embodiment, a material of the conductive layer is copper.

The conductive layer is etched to form a predetermined pattern of the substrate. In this embodiment, the first connecting pads 121, the second connecting pads 122, the third connecting pad 123, and the fourth connecting pad 124 cooperatively form the pattern of the etched conductive layer. In an etching process, a circular-shaped pad is easier to be generated rather than other shapes. Therefore, shape precision of the circular-shaped pad can be easily ensured.

The emitters 20 are connected to the first connecting pads 121, respectively. The receivers 30 are connected to the second connecting pads 122, respectively. The driver chip 40 is connected to the third connecting pad 123. The amplifier 50 is connected to the fourth pad 124. The emitters 20 are electrically connected to the driver chip 40 by conductive wires 60, and the receivers 30 are electrically connected to the amplifier 50 by conductive wires 70. The emitters 20 generate and emit optical signals. The receivers 30 receive optical signals and convert the optical signals into corresponding electrical signals. The driver chip 40 drives the emitters 20 to generate and emit the optical signals. The amplifier 50 amplifies the electrical signals converted by the receivers 30.

In this embodiment, the emitters 20 are laser diodes. In this embodiment, the receivers 30 are photodiodes.

In assembly, the circuit board 10 is positioned on a worktable (not shown), the worktable includes a detecting device (not shown), and the detecting device picks up an image of the circuit board and determines positioning errors of elements to be mounted on the circuit board 10. In detail, predetermined alignment marks are captured by the detecting device, a coordinate system is established according to the alignment marks, and therefore, a mounting position of the element under the coordinate can be determined. The alignment marks should have a regular shape and a clear edge. In the embodiment, the first connecting pads 121 and/or the second connecting pads 122 can be served as alignment marks. In detail, the detecting device captures the first connecting pads 121 as alignment marks, and a line interconnecting centers of the first connecting pads 121 is treated as an axis of a coordinate. Under such a coordinate system, the mounting positions of the emitters 20, the receivers 30, the driver chip 40, and the amplifiers 50 can be determined. Thus, a mounting precision of the optical-electrical module 100 can be ensured. Alternatively, the detecting device can capture the second connecting pads 122, or only one first connecting pads 121 and only one second connecting pads 122, as the alignment marks.

Because the first connecting pads 121 and the second pads 122 are circular-shaped, the first connecting pads 121 and the second connecting pads 122 can be treated as alignment marks during the assembly process of the optical-electrical module 100. Therefore, setting additional alignment marks besides the connecting pads 12 can be omitted, which facilitates minimization of the circuit board 10 and the optical-electrical module 100.

The two alignment marks can be satisfied for the detecting device, and therefore, it is no need to make all of the connecting pads to be circular-shaped.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical-electrical module, comprising:
a circuit board, comprising:
a mounting surface; and
a plurality of connecting pads on the mounting surface, each of the connecting pads defining a mounting area for mounting an element, at least two of the connecting pads being substantially circular-shaped, wherein the optical-electrical module comprises two emitters for emitting optical signals, two receivers for receiving optical signals and converting the optical signal into corresponding electrical signals, a driver chip electrically connected to the emitters for driving the emitters, and a amplifier electrically connected to the receivers for amplifying the electrical signals converted by the receivers, the connecting pads comprise two first connecting pads, two second connecting pads, a third connecting pad, and a fourth connecting pad, the emitters, the receivers, the driver chip, and the amplifier are respectively positioned on the first connecting pads, the second connecting pads, the third connecting pad, and the fourth connecting pad.

2. The optical-electrical module of claim 1, wherein the first connecting pads are substantially circular-shaped.

3. The optical-electrical module of claim 1, wherein the second connecting pads are substantially circular-shaped.

4. The optical-electrical module of claim 1, wherein all of the first connecting pads and the second connecting pads are substantially circular-shaped and are arranged along a linear direction.

* * * * *